Figure 1:
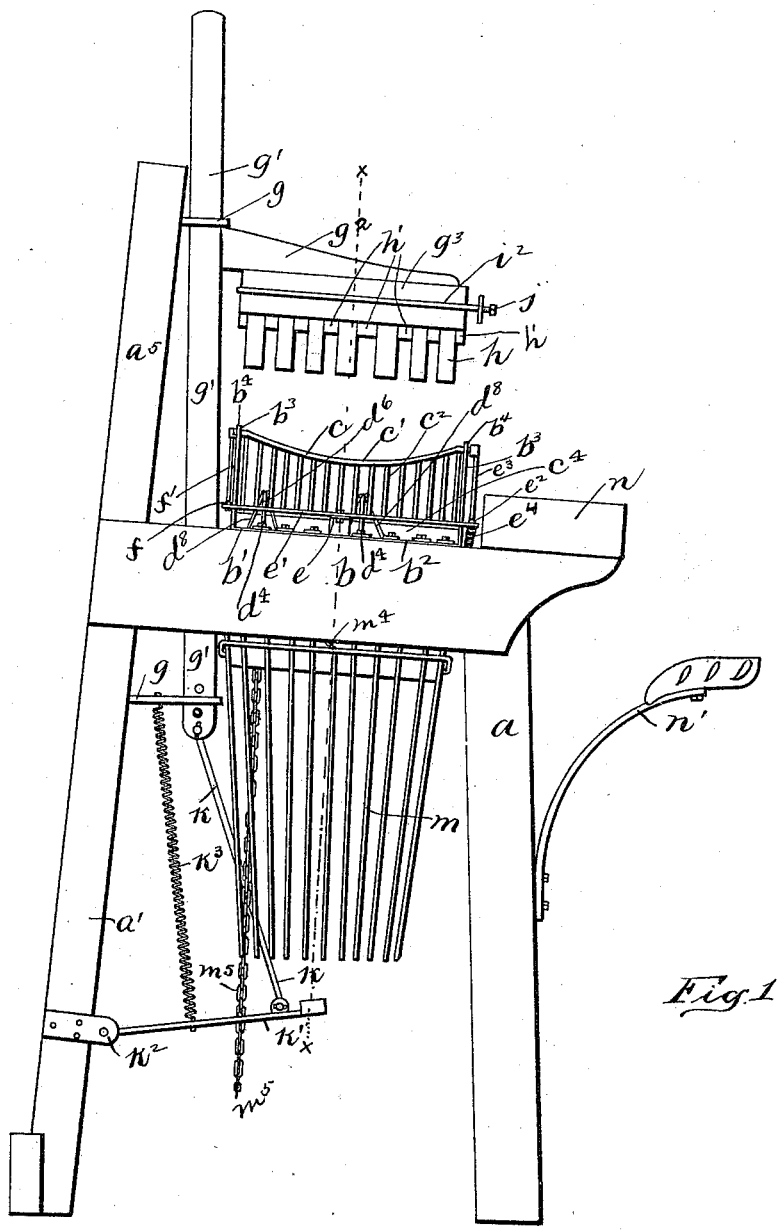

(No Model.)  3 Sheets—Sheet 1.

C. V. JONES.
POTATO CUTTING MACHINE.

No. 513,510. Patented Jan. 30, 1894.

WITNESSES:
H. B. Bradshaw
J. T. Graham

INVENTOR
Carmi V. Jones
BY
Staley & Shepherd
ATTORNEYS.

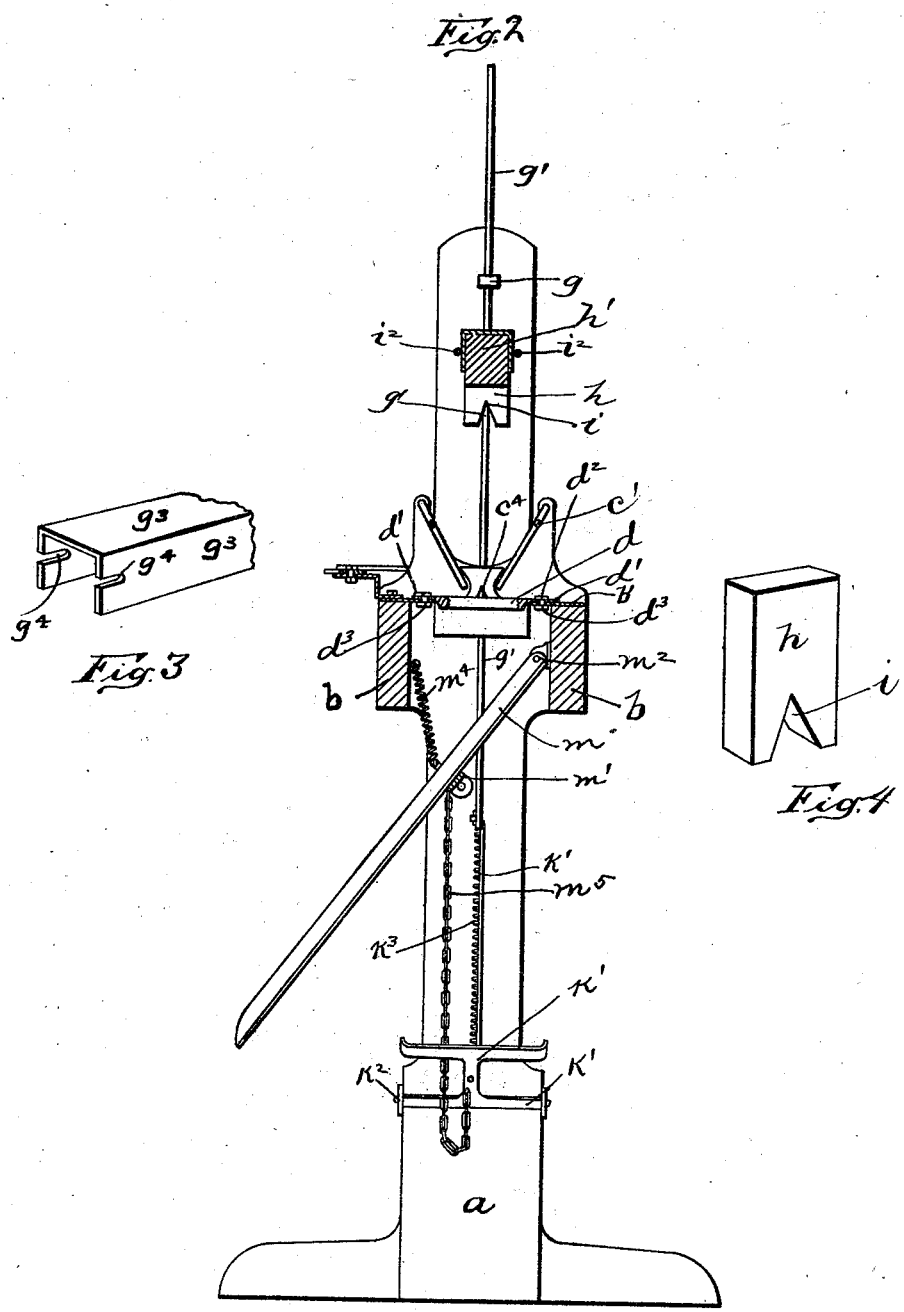

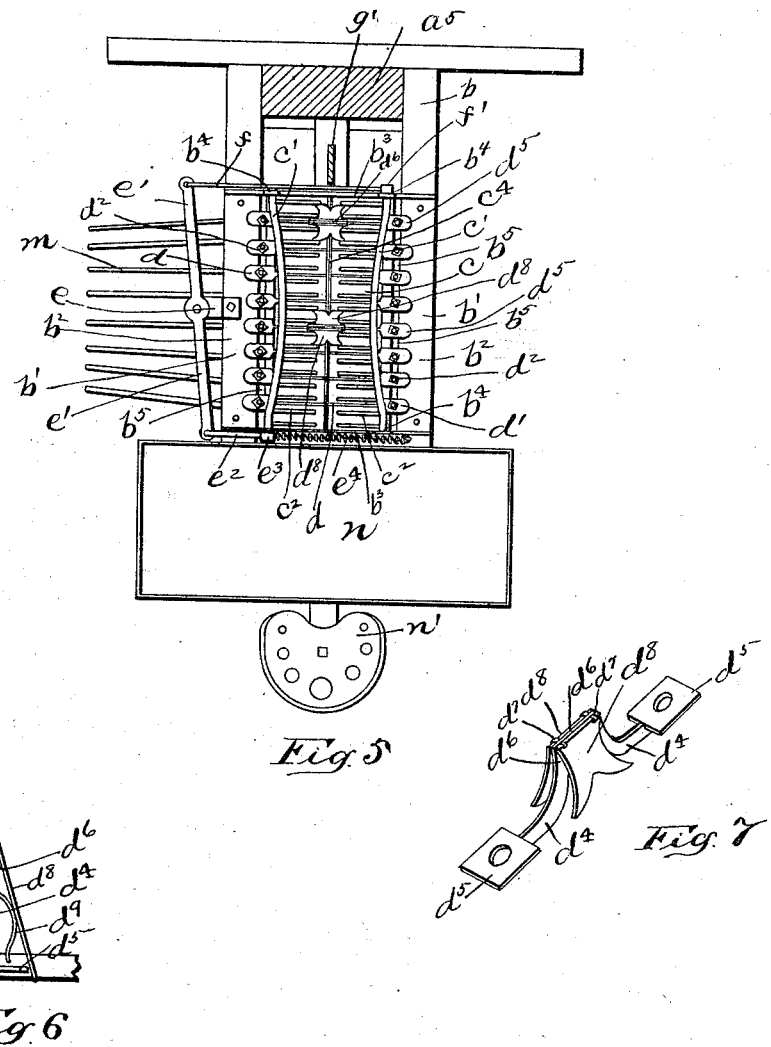

UNITED STATES PATENT OFFICE.

CARMI V. JONES, OF CHILLICOTHE, OHIO.

POTATO-CUTTING MACHINE.

SPECIFICATION forming part of Letters Patent No. 513,510, dated January 30, 1894.

Application filed June 21, 1893. Serial No. 478,345. (No model.)

*To all whom it may concern:*

Be it known that I, CARMI V. JONES, a citizen of the United States, residing at Chillicothe, in the county of Ross and State of Ohio, have invented a certain new and useful Improvement in Potato-Cutting Machines, of which the following is a specification.

My invention relates to potato cutting machines of that class which are adapted for use in cutting seed potatoes for planting purposes and the objects of my invention are to provide a machine of this class of superior construction and arrangement of parts by means of which the process of cutting a potato into the desired planting pieces will be greatly facilitated and to produce improvements in the construction of said machine which will be more particularly pointed out hereinafter. These objects I attain in the manner illustrated in the accompanying drawings, in which—

Figure 1 is a side elevation of my improved potato cutting machine. Fig. 2 is a central vertical section on line $x\,x$ of Fig. 1. Fig. 3 is a detail view in perspective of a portion of the rear end portion of the plunger block holder. Fig. 4 is a detail view in perspective of one of the plunger blocks. Fig. 5 is a plan view of the machine showing the plunger head broken away for the sake of clearness. Fig. 6 is a detail view showing in end elevation one of the hopper partitions and Fig. 7 is a view in perspective of said partition.

Similar letters refer to similar parts throughout the several views.

The supporting frame of my machine consists essentially of an open top table or stand of which $a$ is the front supporting standard or leg, $a'$ is the rear standard and $b$ are parallel frame pieces which form the table or stand top and which connect the forward and rear standards $a\,a'$ as shown.

$b'$ represents a hopper frame which as shown in the drawings preferably consists of two parallel plates $b^2$, the latter resting respectively upon the frame arms $b$ and being connected at their ends by end plates $b^3$, which have their central portions cut away to form two standards $b^4$ at each end of the hopper. The base plates $b^2$ of the frame $b'$ are of such width as to overlap the inner sides of the frame arms $b$, said inwardly projecting or overlapping portions having formed therein longitudinal slotted openings $b^5$.

$c$ represent swinging hopper gates each of which consists as shown in the drawings, of a frame rod $c'$ from which projects downwardly at regular intervals a suitable number of fingers $c^2$. One of the guides or frames thus formed has the ends of its rods $c'$ journaled in the upper end portion of two of the oppositely located hopper frame standards $b^4$.

$c^4$ represents a knife blade which as indicated in the drawings extends longitudinally and midway between the inner edges of the hopper base plates $b^2$ and has its ends secured to the ends of said hopper frame in such position as to bring the lower portion of said knife substantially on a level with the upper sides of the hopper base plates $b^2$.

$d$ represent cross knives which as shown in the drawings connect the hopper frame base plates and which cross the central knife $c^4$ at right angles and on the under side thereof. In the formation of these cross knives $d$ I preferably flatten the ends thereof as indicated at $d'$, said flattened knife ends being adjustably secured to the hopper frame base by means of suitable screws or bolts $d^2$, which pass through said flattened knife ends, thence through the slotted openings $b^5$ and have screwed on their lower ends suitable clamping nuts $d^3$.

For reasons hereinafter specified, I employ at such intervals as may be desired in place of one or more of the cross knives, one or more cross partition plates $d^4$, the latter having flattened ends $d^5$ which conform to the construction of the ends of said cross knives and are adjustably secured as prescribed for the latter upon the base plates $b^2$. This cross plate $d^4$ has as shown in the drawings an upwardly extending central portion or partition wing $d^6$, the under side of which is notched or recessed to admit of the passage therethrough of the longitudinal knife $c^4$.

To the upper edge of each of the partition blades $d^6$ I hinge on opposite sides thereof as indicated at $d^7$ the upper ends of wings $d^8$, the lower portions of the latter being normally caused to flare outwardly by pressure of suitable spring strips $d^9$, the upper ends of which are secured to the partition blade $d^6$ as shown in Fig. 6 of the drawings. These hinged and spring actuated wings $d^8$ are also bifurcated or notched on their lower edges so as to admit of the passage through said notched portion of the longitudinal knife $c^4$.

Upon a suitable bracket $e$ which rises and projects outwardly from the central portion of one of the hopper base plates $b^2$, I pivotally support the central portion of a horizontal lever $e'$, the latter extending slightly past the ends of the hopper frame as shown. The forward end of this lever $e'$ I cause to be jointedly connected with a lever arm $e^2$ which extending in front of the forward end of the hopper in the manner shown, is connected with the forwardly projecting end of that gate rod $c'$ which is nearest the lever $e'$ by means of a suitable arm $e^3$, the lower end of which is jointedly connected with said arm $e^2$ and the upper end of which is rigidly connected with said gate rod $c'$. This arm $e^3$ is normally drawn inward toward the center of the width of the hopper by means of a suitable spring $e^4$ which is connected therewith at one end and which has its remaining end connected with the framework on the opposite side of the stand. As shown in the drawings the rear end of the lever $e'$ is jointedly connected by an arm $f$ with the lower end of an arm $f'$, the upper end of the latter being rigidly connected with the rearwardly projecting end of the remaining gate rod $c'$. From this construction and arrangement of the lever $e'$ and its connected parts it will be seen that the gates $c$ will be normally inclined inward to the positions shown in the drawings. As shown in the drawings the rear frame standards $a'$ are provided with an upward extension $a^5$ and through the openings of guide lugs $g$ which project from the forward face of said rear standard, is adapted to slide vertically a plunger bar $g'$. This plunger bar $g'$ has projecting forwardly from its upper portion immediately above the hopper and substantially parallel therewith an arm $g^2$, with the under side of which is formed a plunger block case $g^3$ which has the form substantially of an inverted cup or rectangular box as shown. As indicated in the drawings, the rear end of this case $g^3$ is open and the rear ends of the side wall are provided with oppositely located longitudinal recesses $g^4$. Within the case $g^3$ are adapted to be inserted the upper end portions of plunger blocks $h$, said plunger blocks being divided one from the other by short follower blocks or filling pieces $h'$, the latter being of such thickness as to retain the plunger blocks at the desired distance apart. As shown in the drawings each of the plunger blocks $h$ has its lower end bifurcated at $i$.

The plunger blocks are retained in position in their case by means of a yoke $i^2$, which as indicated in the drawings, passes about the opposite sides and ends of the case $g^3$, the rear end of said yoke being adapted to partially enter the recesses $g^4$ of the case and bear against the rear end block or follower. This yoke is caused to bind against the rear block or follower by the turning inwardly of a set screw $j$ which passes through the front end of the yoke and bears against the front end of the plunger case.

The lower end of the plunger bar $g'$ is jointedly connected by means of a rod $k$ with the outer end of a suitable foot lever $k'$, the inner or rear end of the latter being jointedly secured to a suitable lug $k^2$ projecting from the lower portion of the rear standard $a'$. This foot lever $k'$ is normally lifted by means of a suitable spring $k^3$, one end of which is secured to said foot lever and the remaining end of which is secured to the framework above. This spring also serves to normally lift the plunger bar $g'$ with which said foot lever is connected thus supporting the plunger case at a point above the hopper as indicated in Fig. 1 of the drawings.

$m$ represents a discharge chute which preferably consists of a number of parallel rods united at suitable intervals by one or more cross pieces $m'$. The upper end of this screen chute is fulcrumed at $m^2$ to the inner side of one of the standard frame pieces $b$ and said chute is normally supported in an outwardly and downwardly inclined position by means of a coil spring $m^4$, which connects said chute with the framework at a point above. The chute is also connected near the center of its length with the foot treadle by means of a suitable chain or its equivalent $m^5$.

Across the forward ends and supported upon the frame pieces $b$ is a potato receptacle or box $n$, the latter being supported adjacent to the forward end of the hopper as shown and from the front standard $a$ projects outwardly at a desirable point thereon a suitable seat $n'$ which is adapted to support the operator of the machine. It will be observed that in the construction of my improved machine I have caused the frame-work to be so arranged as to produce a slight forward inclination of the hopper toward the operator which will facilitate the feeding of the machine.

The operation of my improved potato cutting machine is substantially as follows: The potatoes to be cut having been fed into the hopper by the operator the latter produces a downward movement of the plungers by a depression with his foot of the foot lever. The plunger blocks being so arranged as to coincide with the openings between the cross knives and on opposite sides of the longitudinal knife, it will be seen that said plungers will not only serve to sufficiently press the potato against the knives to result in cutting the latter but that they will operate to force the pieces into which the potato is thus cut through the opening between said knives. From the hopper the sections of the potato thus severed drop on to the inclined chute $m$ from which they may be directed to any suitable receptacle beneath. The chain $m^5$ is of such length as to be drawn taut when said foot lever has reached the point near its lowest limit thus resulting in a jolting or shaking of the chute which will facilitate the discharge of the potato pieces from the latter. Owing to the fact that the cross knives are adjustable and can be moved closer together or farther apart as may be desired it will be seen that the size of the cutting may be varied as desired by the operator. The inwardly inclined positions of the frames $c$ must result as will readily be seen in centering the potato longitudinally over the longitudinal knife. The descent of the plungers and their consequent contact with said frames $c$ will result as will readily be seen in moving the latter sidewise out of the way during the cutting operation. Said frames $c$ being however, subject to the tension of the spring $e^4$ will retain their bearing against the side of the potato and retain it in its proper place throughout the cutting action.

In case it is desired to cut small potatoes or potatoes of different sizes, the length of the receiving portion of the hopper may be varied by substituting for two of the cross knives an equal number of the partition plates $d^4$. The partition plates rising above the cross knives will serve to form end partitions between which may be inserted the potato to be cut. This adjustment in the position of the partitions admits of the potato being cut into any desired number of pieces, for instance, the setting of the partitions so that but one of the cross knives was employed between said partitions the potato would be cut into but four pieces, said cross knife forming in conjunction with the longitudinal knife four openings through which the pieces might pass. In this manner it will be seen that these partitions may be so located as not only to accommodate potatoes of different sizes, but to result in the latter being cut into any desired number of sections or pieces.

It will be observed that the spring actuated wings $d^8$ of the partition bars will tend to operate in conjunction with the side frames $c$ to hold the potato in proper position for cutting. From the construction which I have shown and described it will be evident that a machine is provided by means of which potatoes may be rapidly and uniformly cut into the desired sections for planting purposes. It will also be observed that the construction of my improved machine is such as to admit of its proper operation by unskilled operators and admit of its being produced at a reasonable cost of manufacture.

Having now fully described my invention, what I claim, and desire to secure by Letters Patent, is—

1. In a potato cutting machine the combination with the supporting frame, a hopper thereon, a central longitudinal knife connecting the ends of said hopper as described and cross knives intersecting said central knife and secured on opposite sides thereof, of guide frames $c$ journaled in the ends of said hopper, a lever fulcrumed at one side of said hopper, arms jointedly connecting said lever respectively with said guide frames as described and a spring connecting one of said arms with the framework and normally drawing one end of said lever inward substantially as and for the purpose specified.

2. In a potato cutting machine the combination with the frame, a hopper supported thereon and knives in said hopper, of a vertically sliding and spring support bar $g'$, and an arm $g^2$ supported therefrom above said hopper, a plunger case carried on said arm having an open rear end and recesses in the ends of its sides, plunger blocks $h$ detachably supported in said case, followers between said blocks, a yoke passing about said case the rear end of which is adapted to bear within said case recesses and bear against the rear plungers or followers and a set screw in the forward end of said yoke to bear against the forward edge of said plunger case, substantially as and for the purpose specified.

3. In a potato cutting machine the combination with the frame, a hopper supported thereon, spring actuated frames $c$ journaled in the ends of said hopper, a central longitudinal knife connecting said hopper ends and crossed knives adjustably secured on opposite sides of said central knife, of partition plates $d^4$ adjustably and detachably secured upon opposite sides of said central knife, raised central portions on said partitions, wings $d^8$ hinged to the upper ends of said partition centers and springs between said wings and partition plate centers substantially as and for the purpose specified.

CARMI V. JONES.

In presence of—
JOHN W. GOLDSBERRY,
ARTHUR ROBINSON.